(12) United States Patent
Koike

(10) Patent No.: US 6,356,052 B2
(45) Date of Patent: Mar. 12, 2002

(54) WATERPROOF INDUCTIVE CHARGING PADDLE

(75) Inventor: Yasuhiro Koike, Kariya (JP)

(73) Assignee: Kabushiki Kaisha Toyoda Jisoshokki Seisakusho, Kariya (JP)

( * ) Notice: Subject to any disclaimer, the term of this patent is extended or adjusted under 35 U.S.C. 154(b) by 0 days.

(21) Appl. No.: 09/728,869

(22) Filed: Dec. 1, 2000

(30) Foreign Application Priority Data

Dec. 6, 1999 (JP) .......................................... 11-346239

(51) Int. Cl.⁷ ............................................. H01M 10/26
(52) U.S. Cl. ...................................................... 320/108
(58) Field of Search ................................. 320/107, 108; 336/DIG. 2

(56) References Cited

U.S. PATENT DOCUMENTS 5,412,304 A   5/1995  Abbott ................... 320/115 X Primary Examiner—Edward H. Tso
(74) Attorney, Agent, or Firm—Morgan & Finnegan, LLP

(57) ABSTRACT

An induction type charging paddle engages with a receptacle to charge a battery. The charging paddle has a housing and a circuit board, which is located in the housing to control the charging operation. A case is located in the housing to accommodate the circuit board. The case is sealed to prevent the circuit board from becoming wet.

14 Claims, 5 Drawing Sheets

WATERPROOF INDUCTIVE CHARGING PADDLE

BACKGROUND OF THE INVENTION

The present invention relates to a waterproof structure for charging paddles used in inductive battery chargers.

Generally, there is an induction method for charging batteries in electric vehicles. According to this charging method, as shown in FIG. 6, a charging paddle 50 is connected to a cable 63 extending from a power supply unit. The paddle 50 is inserted to a receptacle 51 of a vehicle to charge a battery.

The charging paddle 50 is provided with a primary core 52 and a primary coil 53. The receptacle 51 is provided with a secondary core 54 and a secondary coil 55. The charging paddle 50 is inserted to a slot 56 of the receptacle 51. An alternating current supplied from the power supply unit flows through the primary coil 53 to generate an electromotive force in the secondary coil 55 by electromagnetic induction. The battery in the vehicle is charged based on this electromotive force.

The charging paddle 50 has an insert head 57 that is inserted in the slot 56 of the receptacle 51 and a grip 58, which is gripped by an operator. The insert head 57 includes the primary core 52, the primary coil 53 and a circuit board 59 having a communication device. The communication device carries out wireless communication with a communication device 60 in the receptacle 51. The communication device in the charging paddle 50 receives information about the vehicle, including the battery capacity, through this communication.

The charging paddle 50 has a housing 62 formed by welding two housing components 61. The cable 63 is introduced into the housing 62 through a lead-in hole defined in the grip 58. A waterproof grommet 64 is fitted in the lead-in hole. The grommet 64 prevents water from entering the housing 62.

However, for example, if it happens that an operator drops the charging paddle 50 and cracks the housing 62, water may penetrate the housing 62. Also, if the cable 63 is pulled very strongly, the waterproof grommet 64 fails to fully seal the lead-in hole, and water may enter the housing 62 through the lead-in hole. Therefore, the circuit board 59 may get wet.

SUMMARY OF THE INVENTION

It is an objective of the present invention to provide a waterproof structure for an inductive charging paddle, which prevents the circuit board from becoming wet, even if water enters the housing of the charging paddle.

In order to attain the above objective, the present invention provides an induction type charging paddle for engaging a receptacle to charge a battery. The charging paddle comprises a housing, a circuit board which is used for controlling the charging of the battery, and a case which is located in the housing to accommodate the circuit board. The case is sealed to prevent the circuit board from becoming wet.

Other aspects and advantages of the invention will become apparent from the following description, taken in conjunction with the accompanying drawings, which illustrate by way of examples the principles of the invention.

BRIEF DESCRIPTION OF THE DRAWINGS

The invention together with the objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will be described below referring to FIGS. 1 to 5.

Figure 2:
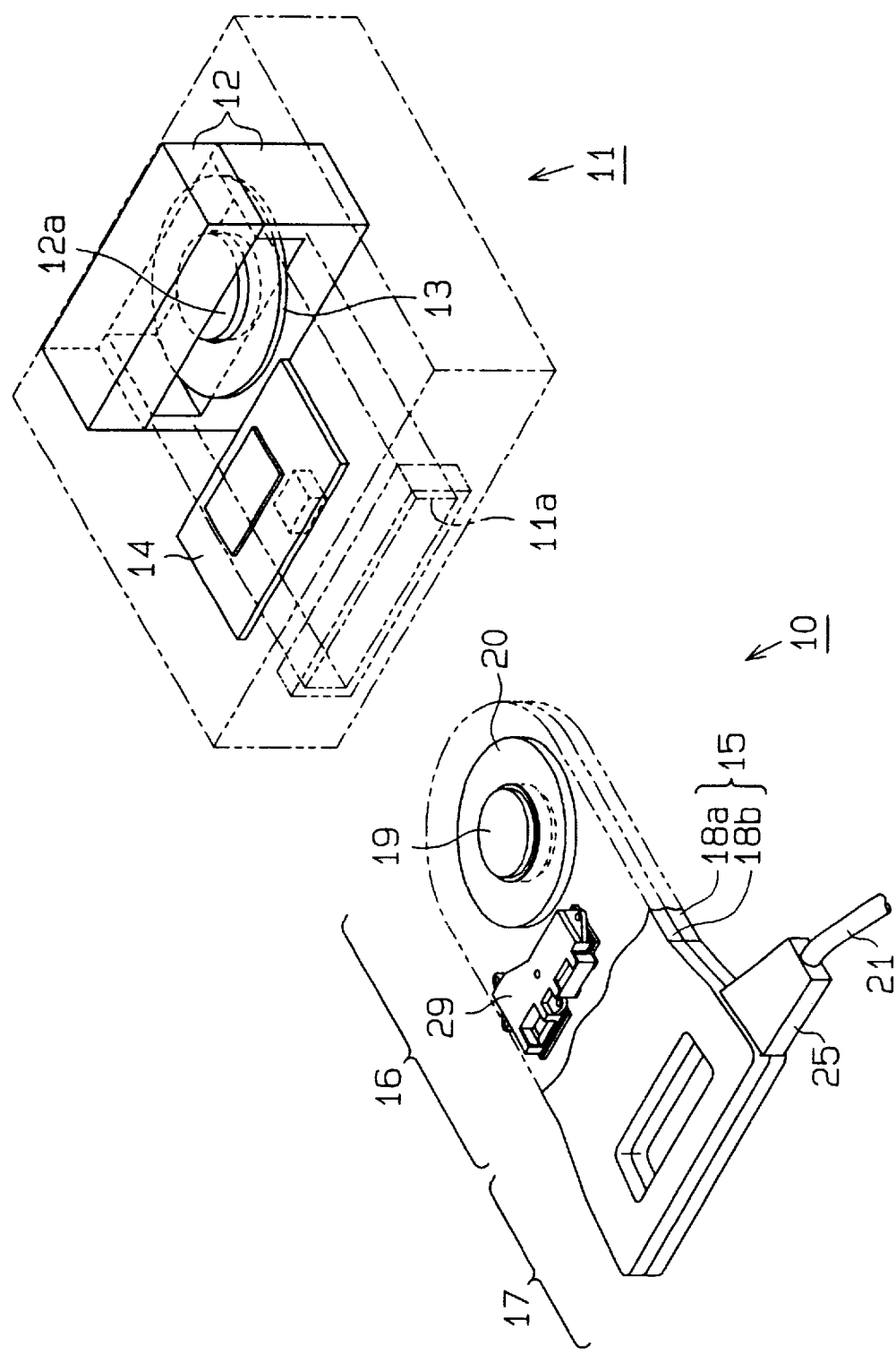
FIG. 2 is a perspective view of the receptacle and the charging paddle shown in FIG. 1.

FIG. 2 shows a charging paddle 10 connected to a cable 21 extending from a stationary power supply unit and a receptacle 11 incorporated to a vehicle.

The receptacle 11 is provided with a secondary core 12 and a secondary coil 13, which is wound around a cylindrical magnetic pole 12a of the core 12. The receptacle 11 has a circuit board 14 on which a wireless communication device is mounted.

The charging paddle 10 has a housing 15, as shown in FIG. 2. The charging paddle 10 includes an insert head 16, which is inserted to a slot 11a of the receptacle 11, and a grip 17, which is to be gripped by an operator. The housing 15 has a pair of housing members 18a and 18b. The housing members 18a and 18b are each integrally molded using an infrared-transmitting resin (e.g., a polycarbonate resin), which is colored using an infrared-transmitting pigment.

The insert head 16 includes a cylindrical primary core 19 and an annular primary coil 20, which is fitted around the primary core 19.

Figure 1:
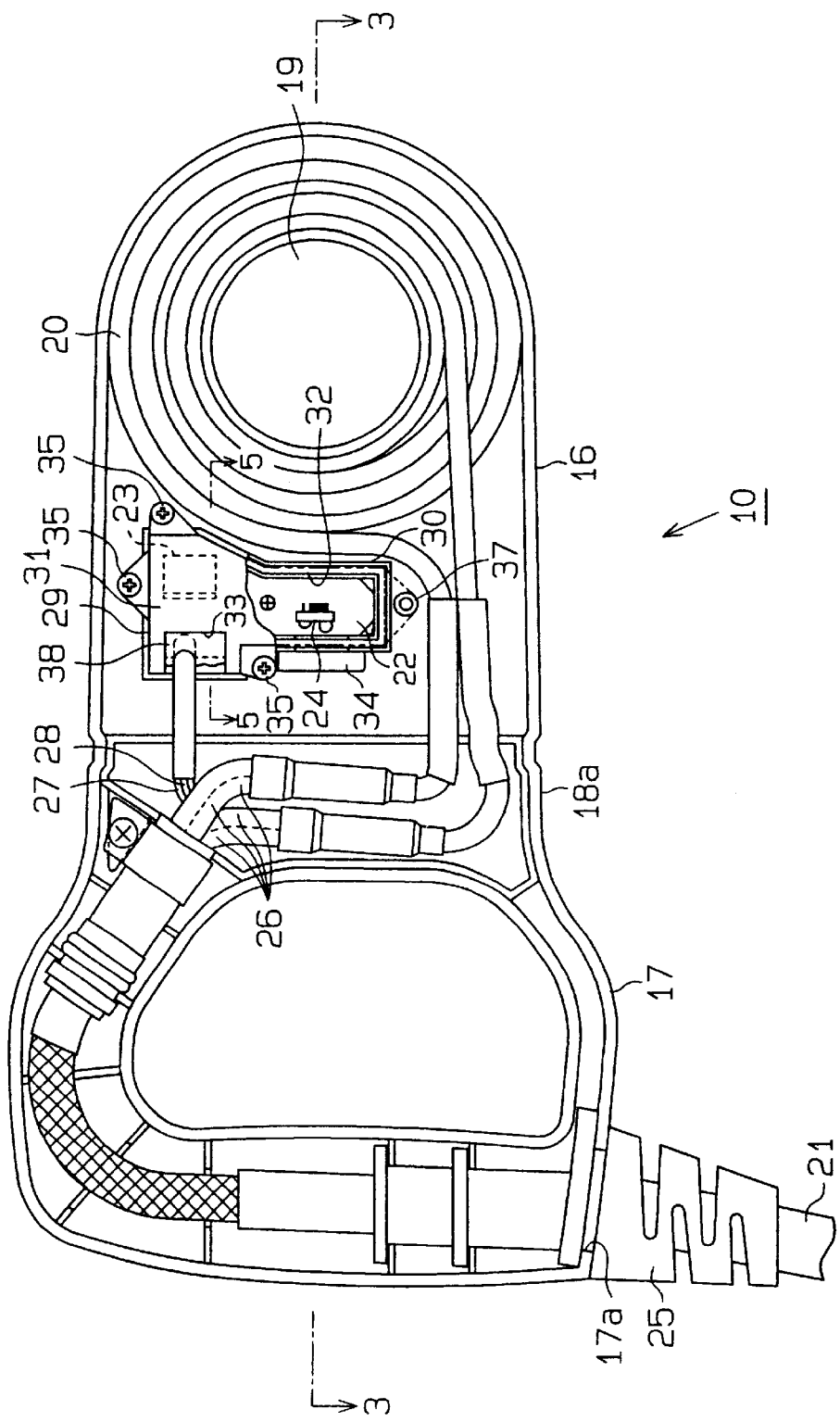
FIG. 1 is a cross-sectional view showing the charging paddle according to a first embodiment of the present invention.

As shown in FIG. 1, the grip 17 has a lead-in hole 17a, in which a waterproof grommet 25 is fitted. The cable 21, which extends from the power supply unit, is inserted through the waterproof grommet 25 into the housing 15.

Figure 3:
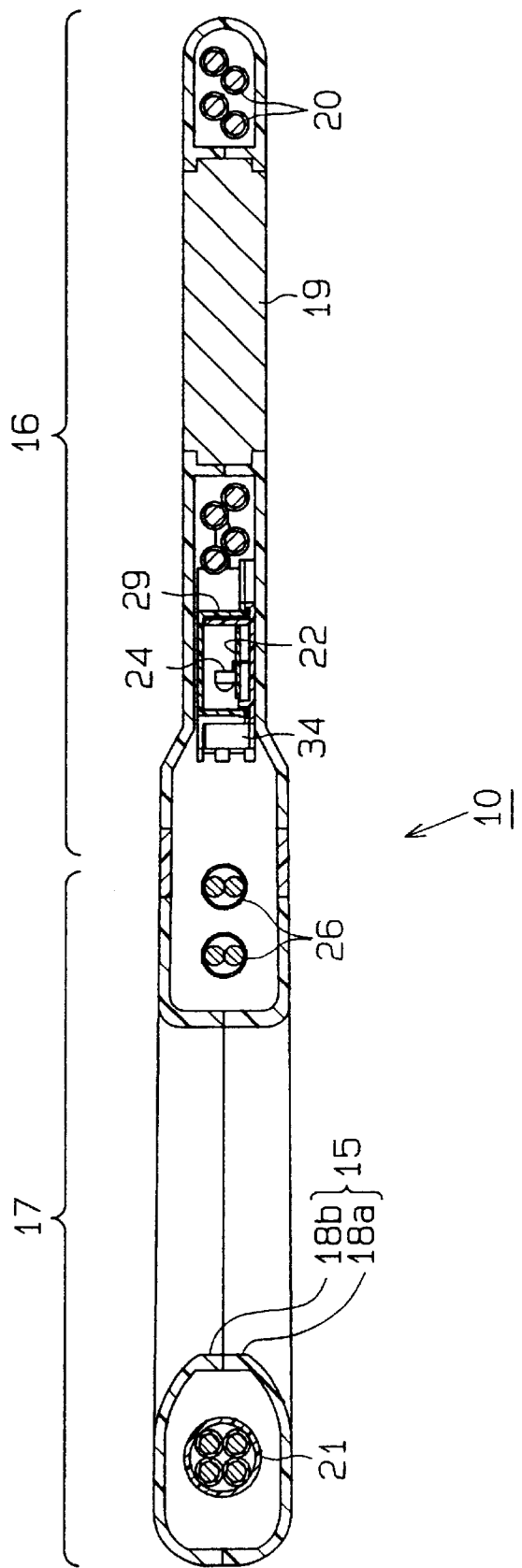
FIG. 3 is a cross-sectional view taken along the line 3—3 in FIG. 1.

As shown in FIGS. 1 and 3, the insert head 16 is provided with a circuit board 22 for communication. The circuit board 22 confirms whether the charging paddle 10 is correctly connected to the receptacle 11. Further, information about the vehicle, including the battery capacity, is transmitted through the circuit board 22.

In this embodiment, infrared communication is employed as the communication method. The circuit board 22 includes a communication integrated circuit 23 and an infrared communication element 24.

The cable 21 includes electric supply lines 26 connected to the primary coil 20, power source lines 27 and signal lines 28, which are connected to the circuit board 22 with the power supply unit.

Next, the characteristics of the present invention will be described specifically.

The circuit board 22 is contained in a water-proof case 29. The case 29 is made of a colorless and transparent infrared transmitting resin. The case 29 substantially conforms to the circuit board 22, as shown in FIG. 1.

Figure 4:
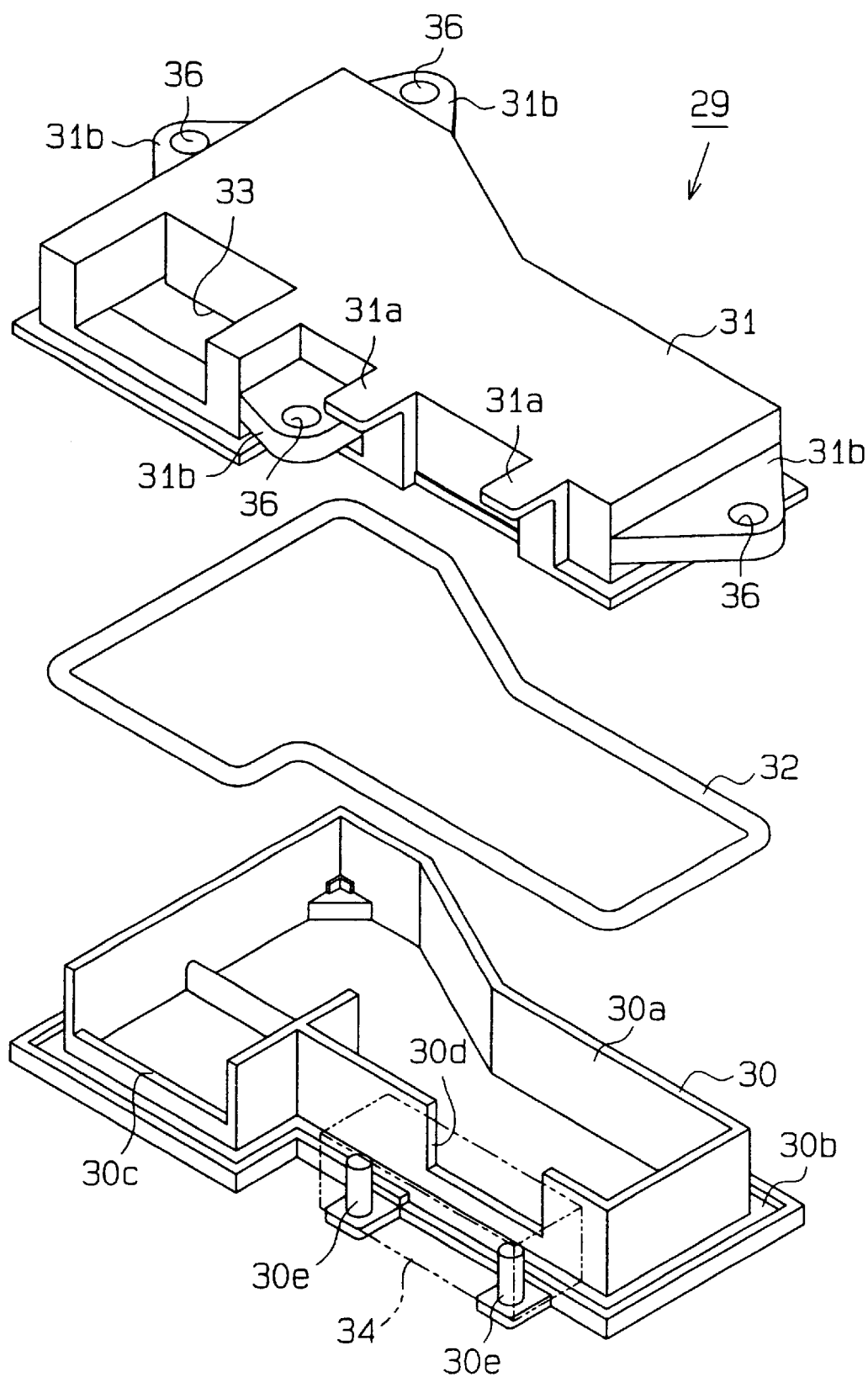
FIG. 4 is an exploded perspective view of the case for the circuit board shown in FIG. 1.

As shown in FIG. 4, the case 29 has a first case component 30, a second case component 31 and an annular gasket 32 located between these two cases 30 and 31.

The first case component 30 has an upright guide wall 30a. The first case component 30 also has an peripheral groove 30b formed along the outer surface of the guide wall 30a. The gasket 32 is fitted in this groove 30b. The second case component 31 is fitted about the guide wall 30a. The first case component 30 contacts the gasket 32. The circuit board 22 is contained in the first case component 30 and is positioned by the guide wall 30a.

Figure 5:
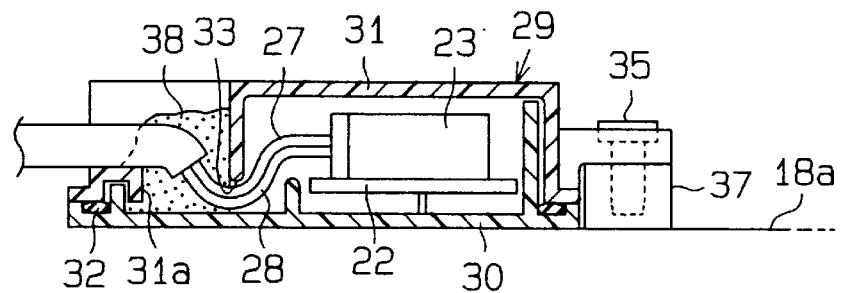
FIG. 5 is an enlarged cross-sectional view taken along the line 5—5 in FIG. 1.
Figure 6:
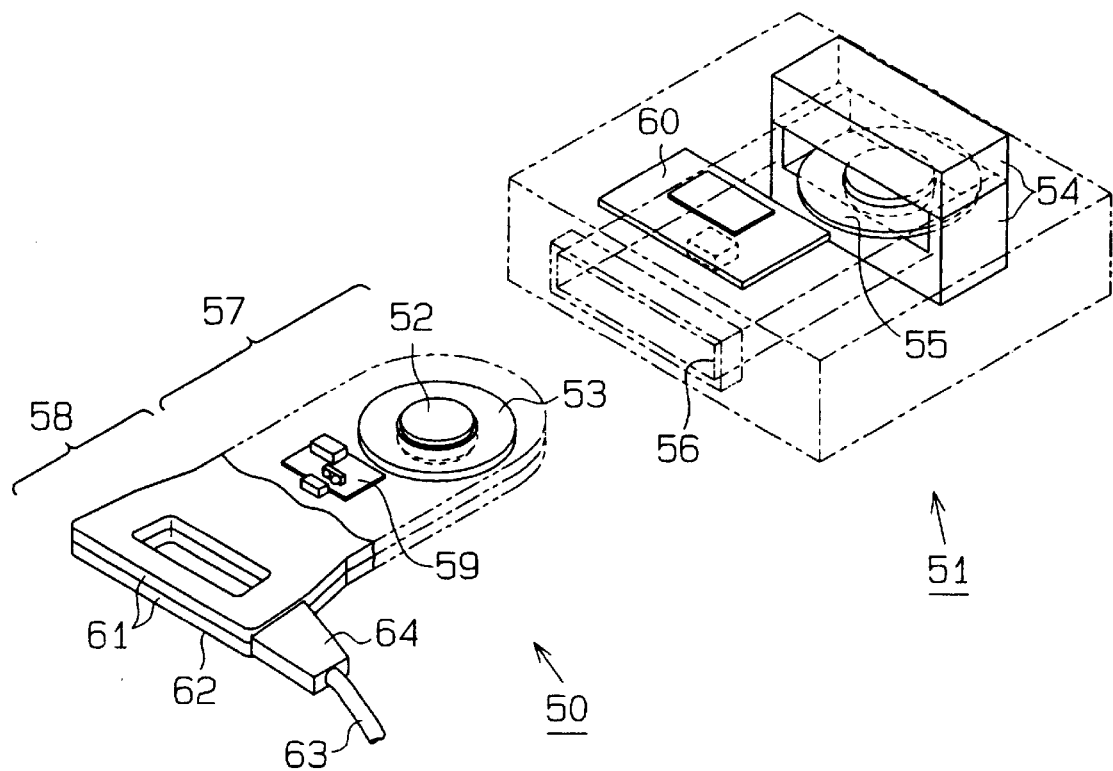
FIG. 6 is a perspective view showing the receptacle and the charging paddle of the prior art.

A notch 30c is formed in the guide wall 30a. An opening 33 is defined in the second case component 31 to oppose the notch 30c. As shown in FIG. 5, the power source lines 27 and signal lines 28 connected to the circuit board 22 are led out through the notch 30c and the opening 33 to the outside of the case 29.

As shown in FIG. 4, a notch 30d is defined in the first case component 30 to oppose a light-emitting section and a light-receiving section of the communication element 24. A prism 34 is supported by a pair of pins 30e on the external side of the guide wall 30a to oppose the notch 30d. The second case component 31 has a pair of regulating pieces 31a for engaging the prism 34. The prism 34 causes the infrared light radiated from the communication element 24 to exit from both sides of the charging paddle 10. The prism 34 also leads the infrared radiation coming in from either side of the paddle 10 to the communication element 24. This enables communication when the charging paddle 10 is inserted to the slot 11a (see FIG. 2) in both possible orientations of the paddle 10 with respect to the receptacle 11.

The inner surface of the housing member 18a has protrusions, such as ribs (not shown), for locating the first case component 30 in a predetermined position. As shown in FIG. 4, a plurality of fixing pieces 31b are formed at the periphery of the second case component 31 to protrude horizontally. Each fixing piece 31b contains a hole 36 for receiving a fastener such as a screw 35 (see FIG. 1). A plurality of bosses 37 are formed to protrude from the inner surface of the housing member 18a, at sites corresponding to the fixing pieces 31b of the second case component 31, respectively (only one boss 37 is shown in FIGS. 1 and 5).

The circuit board 22 is contained in the case 29, and with the lines 27 and 28 are led out from the notch 30c and the opening 33. The case 29 is located in a predetermined position in the housing member 18a. The screws 35 secure the fixing pieces 31 to the bosses 37, respectively, to fix the case 29 to the housing member 18a. Since the screws 35 are outside of the gasket 32, the case 29 is hermetically sealed. Further, the notch 30c and the opening 33 are hermetically sealed by a sealing resin (e.g., potting material) 38.

As described above, the joint between the first case component 30 and the second case component 31 of the case 29 is sealed by the gasket 32, and the opening 33 is sealed by the sealing resin 38 to form water-proof seals.

This embodiment has the following effects.

If water enters the housing 15 through cracks formed in the charging paddle 10 or through the lead-in hole 17a of the cable 21, the circuit board 22 is protected in the hermetically sealed and water-proof case 29.

The communication element 24 on the circuit board 22 performs reliable infrared communication with the receptacle 11 through the housing 15 and case 29. Further, since the case 29 is colorless and transparent, whether or not the circuit board 22 is set properly in the case 29 can be visually confirmed from the outside of the case 29. Thus, a defect in the position of the circuit board 22 in the case 29 can be eliminated before the housing members 18a and 18b are welded.

The sealing resin 38 is poured into the opening 33 to seal it, so that the case 29 is fully sealed against moisture.

Since the screws 35 are on the external side of the gasket 32, they do not impair the gasket 32. For example, if a screw is driven into a location inside the gasket 32, that location must be additionally sealed. However, such a complicated sealing structure is not necessary.

The shape the case 29 substantially conforms to that of the circuit board 22. This reduces the size of the case 29 to facilitate incorporation of the case 29 into the housing 15. Further, the circuit board 22 is correctly positioned by the guide wall 30a.

Since the prism 34 is attached to the case 29, the prism 34 can be easily positioned with respect to the communication element 24 by merely setting the circuit board 22 in the case 29.

The above embodiment can be modified as follows.

The gasket 32 may be replaced with a sealing resin, or a liquid sealing material may be applied to the joint faces.

The case 29 may be fixed to the housing 15 using, for example, an adhesive.

The opening 33 may be sealed with a sealing material such as a rubber.

While the case 29 includes the first case component 30 and the second case component 31, the lid-like case component may be bonded to the housing 15 with a sealing material.

The case may contain a plurality of circuit boards.

The method of communication is not limited to infrared communication. For example, an antenna may be contained in the housing 15 to enable radio communication. In this case, the material of the case 29 is not limited to infrared transmitting resin, and the case 29 may be opaque. Further, a combination of infrared communication and radio wave communication may be used as the communication method.

Circuit boards for charging control devices other than the communication device may be contained in the case 29. Also, more than one case 29 may be incorporated, as necessary.

The present invention may be applied not only to a vehicle charging paddle but also to various kinds of battery-powered apparatuses, such as self-propelled robots.

It should be apparent to those skilled in the art that the present invention may be embodied in many other specific forms without departing from the spirit or scope of the invention.

Therefore, the present examples and embodiments are to be considered as illustrative and not restrictive, and the invention is not to be limited to the details given herein, but may be modified within the scope of the appended claims.

What is claimed is:

1. An induction type charging paddle for engaging a receptacle to charge a battery, the charging paddle comprising:

a housing;

a circuit board used for controlling the charging of the battery; and a case located in the housing to accommodate the circuit board, wherein the case is sealed to prevent the circuit board from becoming wet.

2. The charging paddle according to claim 1, wherein the receptacle has an infrared communication device, and wherein an infrared communication device is located on the circuit board to communicate with the infrared communication device of the receptacle.

3. The charging paddle according to claim 2, wherein the housing and the case is formed with a resin that transmits infrared light.

4. The charging paddle according to claim 3, wherein the housing has a first side and a second side, wherein the second side is substantially parallel to the first side, and wherein a prism is located in the charging paddle, and the prism causes the infrared light radiated from the communication device to exit from both of two opposite sides of the charging paddle, and the prism leads infrared radiation from either of the two opposite sides of the paddle to the communication device.

5. The charging paddle according to claim 4, wherein the prism is attached to the case.

6. The charging paddle according to claim 1, wherein the shape of the case substantially conforms to that of the circuit board.

7. The charging paddle according to claim 1, wherein an opening is defined in the case, and the opening is sealed by a sealing resin.

8. The charging paddle according to claim 1, wherein the case has a first case component and a second case component, which are fitted to each other, wherein a peripheral seal member is located between the first case component and the second case component.

9. The charging paddle according to claim 8, wherein a fastener fixes the case to the housing, wherein the fastener is located outside of the seal member.

10. The charging paddle according to claim 1, wherein the case is transparent to infrared light.

11. An induction type charging paddle for cooperating with a receptacle to charge a battery, wherein the receptacle has an infrared communication device, the charging paddle comprising:

a housing;

a circuit board used for controlling the charging of the battery, wherein the circuit board has an infrared communication device to communicate with the infrared communication device of the receptacle; and a case located in the housing to accommodate the circuit board, wherein the case is made with an infrared-transmitting resin, and the case is colorless and transparent, and wherein the case is sealed to prevent moisture from reaching the circuit board.

12. The charging paddle according to claim 11, wherein an opening is defined in the case, and the opening is sealed by a sealing resin.

13. The charging paddle according to claim 11, wherein the case has a first case component and a second case component, which are fitted to each other, wherein a peripheral seal member is located between the first case component and the second case component.

14. The charging paddle according to claim 13, wherein a fastener fixes the case to the housing, wherein the fastener is located outside of the seal member.

* * * * *

UNITED STATES PATENT AND TRADEMARK OFFICE
CERTIFICATE OF CORRECTION

PATENT NO.    : 6,356,052 B1
DATED         : March 12, 2002
INVENTOR(S)   : Koike It is certified that error appears in the above-identified patent and that said Letters Patent is hereby corrected as shown below:

<u>Title page,</u>
Item [73] Assignee, please delete "Jisoshokki" and insert -- Jidoshokki --.

Signed and Sealed this

Twenty-first Day of May, 2002

Attest:

JAMES E. ROGAN
Attesting Officer     Director of the United States Patent and Trademark Office